(12) United States Patent
Hart et al.

(10) Patent No.: US 7,566,358 B2
(45) Date of Patent: Jul. 28, 2009

(54) FUEL STORAGE TANK PRESSURE MANAGEMENT SYSTEM AND METHOD EMPLOYING A CARBON CANISTER

(75) Inventors: Robert P. Hart, East Hampton, CT (US); Kent Reid, Canton, CT (US)

(73) Assignee: Veeder-Root Company, Simsbury, CT (US)

( * ) Notice: Subject to any disclaimer, the term of this patent is extended or adjusted under 35 U.S.C. 154(b) by 436 days.

(21) Appl. No.: 11/538,847

(22) Filed: Oct. 5, 2006

(65) Prior Publication Data

US 2007/0131111 A1 Jun. 14, 2007

Related U.S. Application Data

(60) Provisional application No. 60/723,757, filed on Oct. 5, 2005, provisional application No. 60/811,360, filed on Jun. 6, 2006.

(51) Int. Cl.
*B01D 53/04* (2006.01)
(52) U.S. Cl. ............... 96/110; 96/111; 96/112; 96/148; 55/385.4; 141/59
(58) Field of Classification Search ............ 55/385.4; 96/109–112, 148; 141/59
See application file for complete search history.

(56) References Cited

U.S. PATENT DOCUMENTS

| | | | | |
|---|---|---|---|---|
| 3,867,111 | A | * | 2/1975 | Knowles ............ 95/21 |
| 4,025,324 | A | * | 5/1977 | Stackhouse et al. ...... 96/111 |
| 4,058,147 | A | * | 11/1977 | Stary et al. ............ 141/45 |
| 4,166,485 | A | | 9/1979 | Wokas |
| 5,038,838 | A | * | 8/1991 | Bergamini et al. ...... 141/59 |
| 5,040,577 | A | | 8/1991 | Pope |
| 5,305,807 | A | | 4/1994 | Healy |
| RE035,238 | E | | 5/1996 | Pope |
| 5,571,310 | A | | 11/1996 | Nanaji |
| 5,626,649 | A | | 5/1997 | Nanaji |

(Continued)

OTHER PUBLICATIONS

Marc A. Portnoff, Richard Grace, Alberto M. Guzman, and Jeff Hibner, "Measurement and Analysis of Absistor and Figaro Gas Sensors Used for Underground Storage Tank Leak Detection," Camegie Mellon Research Institute, Aug. 1991.

(Continued)

*Primary Examiner*—Frank M Lawrence
(74) *Attorney, Agent, or Firm*—Nelson Mullins Riley & Scarborough LLP

(57) ABSTRACT

A carbon canister to adsorb hydrocarbons from a hydrocarbon air mixture in a UST system to prevent fugitive emissions due to overpressurization. The carbon canister has an inlet port at one end coupled to the UST system. An outlet port on the opposite end of the canister is connected to a flow-limiting orifice with a known calibrated flow rate that vents in a controlled fashion to the atmosphere. When UST pressure rises slightly above ambient pressure, fuel vapors and air from the UST system enters, via the inlet port, into the canister, where hydrocarbons are adsorbed onto the surface of the activated carbon. The cleansed air vents through the controlled flow outlet port to atmosphere, thereby preventing excessive positive pressure from occurring in the UST system. The activated carbon is purged of hydrocarbons by means of reverse air flow caused by negative UST pressures that occur during periods of ORVR vehicle refueling.

37 Claims, 7 Drawing Sheets

U.S. PATENT DOCUMENTS

| | | |
|---|---|---|
| 5,671,785 A | 9/1997 | Andersson |
| 5,755,854 A | 5/1998 | Nanaji |
| 5,782,275 A | 7/1998 | Hartsell, Jr. et al. |
| 5,843,212 A | 12/1998 | Nanaji |
| 5,860,457 A | 1/1999 | Andersson |
| 5,992,395 A | 11/1999 | Hartsell, Jr. et al. |
| 6,026,866 A | 2/2000 | Nanaji |
| 6,064,287 A * | 5/2000 | Jones .................. 333/248 |
| 6,065,507 A | 5/2000 | Nanaji |
| 6,123,118 A | 9/2000 | Nanaji |
| 6,131,621 A | 10/2000 | Garrard |
| 6,174,351 B1 * | 1/2001 | McDowell et al. ............ 96/4 |
| 6,217,639 B1 * | 4/2001 | Jackson .................. 96/134 |
| 6,460,579 B2 | 10/2002 | Nanaji |
| 6,478,849 B1 | 11/2002 | Taylor et al. |
| 6,499,516 B2 | 12/2002 | Pope et al. |
| 6,622,757 B2 | 9/2003 | Hart et al. |
| 6,644,360 B1 | 11/2003 | Sobota et al. |
| 6,712,101 B1 | 3/2004 | Nanaji |
| 6,800,114 B2 * | 10/2004 | Vanderhoof et al. ........... 95/117 |
| 6,805,173 B2 | 10/2004 | Healy |
| 7,228,850 B2 | 6/2007 | King |
| 2004/0045435 A1 * | 3/2004 | Golner et al. ................. 95/117 |
| 2007/0051242 A1 * | 3/2007 | Petrik .......................... 96/108 |
| 2007/0266851 A1 | 11/2007 | Fink |

OTHER PUBLICATIONS

"Jonh Zink Adsorption/Absorption Vapor Recovery System," http://www.johnzink.com/products/v_con/html/vcon_iz_procdiag_ca.htm.

* cited by examiner

FUEL STORAGE TANK PRESSURE MANAGEMENT SYSTEM AND METHOD EMPLOYING A CARBON CANISTER

RELATED APPLICATIONS

This application claims priority to U.S. Provisional Patent Application No. 60/723,757 entitled "FUEL STORAGE TANK PRESSURE MANAGEMENT SYSTEM AND METHOD EMPLOYING A CARBON CANISTER," filed on Oct. 5, 2005, and U.S. Provisional Patent Application No. 60/811,360 entitled "FUEL STORAGE TANK PRESSURE MANAGEMENT SYSTEM AND METHOD EMPLOYING A CARBON CANISTER," filed on Jun. 6, 2006, both of which are incorporated herein by reference in their entireties.

FIELD OF THE INVENTION

The present invention relates to a fuel storage tank pressure management system and method employing a carbon canister to adsorb hydrocarbons and reduce pressure inside a fuel storage tank to prevent fugitive emissions. Adsorbed hydrocarbons are returned to the fuel storage tank during under-pressurization conditions.

BACKGROUND OF THE INVENTION

The growing population of vehicles in the U.S. with Onboard Refueling Vapor Recovery (ORVR) equipment installed is resulting in increased vaporization occurring in underground storage tanks (USTs). When a vehicle equipped with an ORVR system refuels at a Gasoline Dispensing Facility (GDF), fresh air is returned to the tank instead of saturated vapor as in the case when a standard vehicle refuels. This returned fresh air causes increased evaporation of the fuel in the USTs. This increased evaporation results in continuously rising pressures in the ullage spaces of USTs. If pressures rise above ambient atmospheric pressure, fuel vapor emissions can occur because UST systems are not perfectly tight.

New Stage II Vapor Recovery requirements in the state of California require that UST systems maintain ullage pressures that average less than ¼ inch of water column above ambient pressure. Current front-end ORVR detection systems for GDFs provide active pressure control when the GDF is in operation and there are ORVR vehicles refueling, but may allow the UST to over pressurize during periods of station closure or low vehicle activity. To avoid the possibility of over pressurization of the UST, a back-end vapor processor is needed to process the excess vapor caused by evaporation.

Processors on the market today were designed to work on systems that do not use front-end ORVR detection systems to limit the amount of air that is ingested into the UST, and are expensive and overkill for this application. There is a need for a low cost solution capable of processing the small amount of vapor necessary to keep a UST system in compliance during periods of station shutdown or low activity. A prior solution that handled small amounts of vapor is the Healy Systems' bladder tank described in U.S. Pat. No. 6,805,173 B2. This solution is expensive and consists of a very large above ground tank with a flexible bladder liner. The large tank is difficult to locate and install at GDFs, and is not generally accepted by users but is required by current law in California. Users would prefer a cheaper, more palatable solution.

BRIEF DESCRIPTION OF THE DRAWINGS

The accompanying drawing figures incorporated in and forming a part of this specification illustrate several aspects of the invention, and together with the description serve to explain the principles of the invention.

SUMMARY OF THE INVENTION

Figure 1:
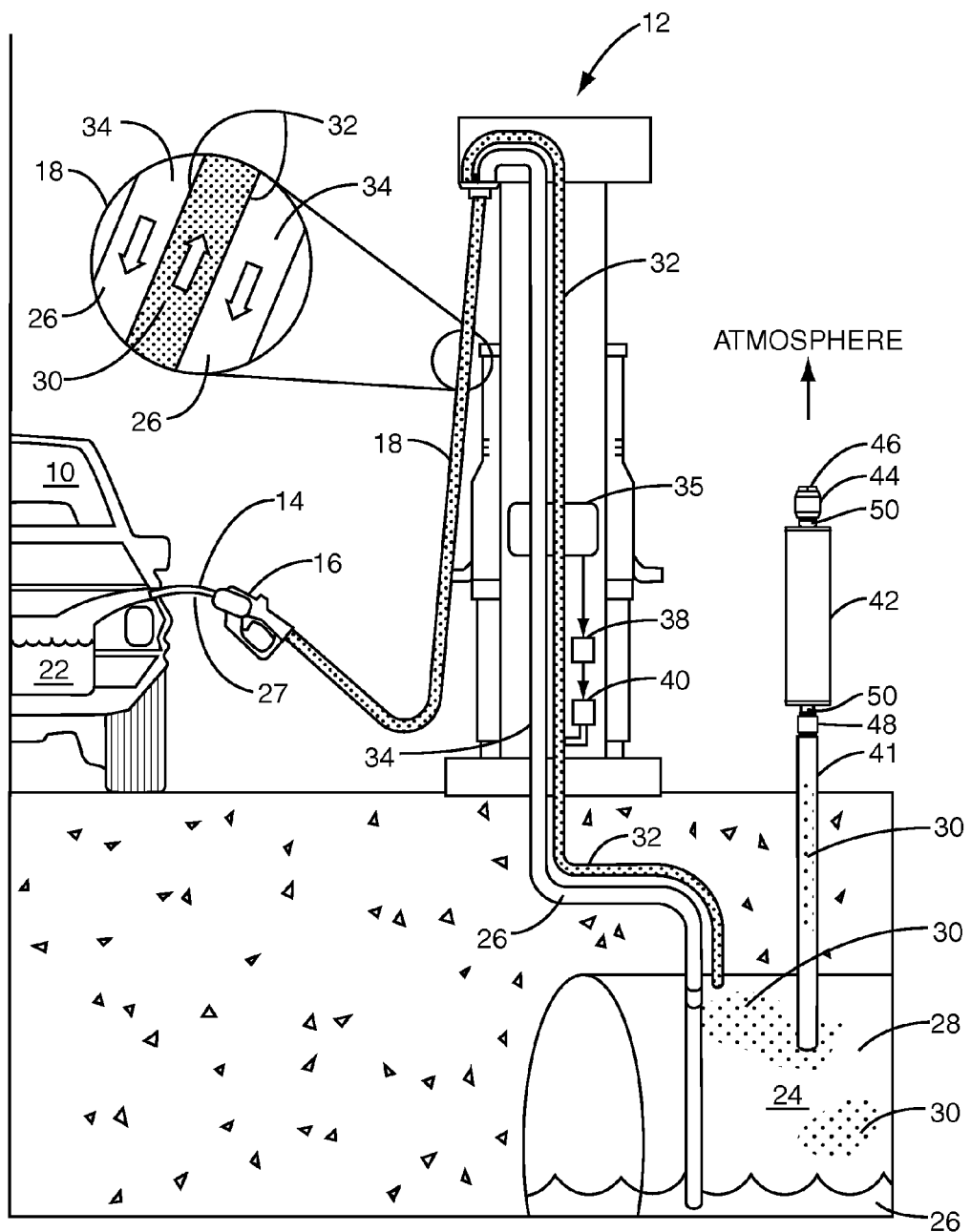
FIG. 1 is an illustration of a Stage II vapor recovery-equipped fuel dispenser and fuel storage tank in a service station environment employing a carbon canister in accordance with the present invention.

The present invention provides a canister filled with hydrocarbon adsorbing activated carbon (carbon canister) to adsorb hydrocarbons from a hydrocarbon air mixture in the ullage of a UST system to prevent fugitive emissions due to overpressurization, with an inlet port at one end attached though a tube or other connection means to the tank vent line or other vapor access point of a UST system. An outlet port on the opposite end of the canister is connected to a flow-limiting orifice with a known calibrated flow rate that vents in a controlled fashion to the atmosphere. When UST pressure rises slightly above ambient, fuel vapors and air from the UST system enters, via the inlet port, into the canister, where hydrocarbons are adsorbed onto the activated carbon. The cleansed air vents through the controlled flow outlet port to atmosphere. The removal of fuel vapor and air from the UST system limits pressure in the UST system and prevents excessive positive pressure from occurring. The activated carbon is purged of hydrocarbons by means of reverse air flow caused by negative UST pressures that occur during periods of ORVR vehicle refueling.

This solution of the present invention is small, low cost and is easily installed without requiring electrical power or any controlling mechanisms. Bidirectional flow, including purging, is driven passively by the normal positive and negative pressures that occur in UST systems, typically in a diurnal cycling manner as opposed to systems requiring an active vacuum or pressure component, such as a vacuum pump, to direct the hydrocarbon air mixture from the UST to the canister. Thus, the carbon canister requires little or no maintenance and has a very long working life.

In one carbon canister embodiment, the canister is formed by an inner pipe surrounded by an outer pipe. A space is formed therebetween. Hydrocarbon adsorbing carbon is placed in the space between the inner and outer pipe. The inner pipe is coupled to a vent pipe coupled to the UST. In this manner, the carbon canister sits on top of the vent pipe to couple the canister to the UST to receive the hydrocarbon air mixture.

In an alternative carbon canister embodiment, the canister is only comprised of one internal chamber. The canister is coupled to the outside of the vent pipe coupled to the UST. A tube, hose, or other coupling means is coupled between the inlet port of the carbon canister and the vent pipe to couple the canister to the UST to receive the hydrocarbon air mixture. A diffuser may also be employed to diffuse the air entering into the canister to more evenly spread the air flow across the cross-section of the canister. Further, packing components internal to the canister may be employed to tightly pack the carbon together inside the canister to improve hydrocarbon adsorption.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

FIG. 1 illustrates a typical Stage II vapor recovery-equipped fuel dispensing system in a service station environment employing a carbon canister in accordance with the present invention for adsorbing hydrocarbons from the UST. A vehicle 10 is proximate to a fuel dispenser 12 for refueling. The fuel dispenser 12 contains a nozzle 16 that contains a spout 14. The nozzle 16 is connected to a hose 18, which is fluidly coupled to an underground storage tank (UST) 24 where liquid gasoline 26 resides. When the customer is dispensing gasoline 26 into his vehicle 10, the customer removes the nozzle 16 from the fuel dispenser 12 and inserts the spout 14 into a vehicle fuel tank 22. The fuel dispenser 12 is then activated, and the liquid gasoline 26 is pumped by a pump (not shown) from the UST 24 through a fuel supply conduit 34 into the hose 18, eventually being delivered through the nozzle 16 and spout 14 into the vehicle fuel tank 22.

The fuel dispenser 12 illustrated in FIG. 1 is also equipped with an assist-type Stage II vapor recovery system for exemplary purposes, whereby vapors 30 expelled from the vehicle fuel tank 22 are captured as liquid fuel 26 is dispensed into the vehicle fuel tank 22 using a suction force created by a pump. However, the present invention is equally applicable for "balance" type, non-assist Stage II vapor recovery equipped dispensers, whereby assistance of an external pump or suction force is not provided since the nozzle 16 forms a sealed, closed system with the vehicle 10 where vapors expelled from the vehicle 10 are forced back inside the nozzle spout 14 under an equal exchange principle. The hose 18 contains not only the fuel supply conduit 34 delivery passage for liquid fuel 26 to enter into the vehicle fuel tank 22, but also a vapor return passage 32, whereby vapors 30 captured during fueling of the vehicle fuel tank 22 are returned back to the UST 24. FIG. 1 contains an exploded view of the hose 18 showing the fuel supply conduit 34 and the vapor return passage 32.

In the example of an assist-type Stage II vapor recovery equipped dispenser, when a customer begins a fueling transaction, the fuel dispenser's control system 35 activates a motor 38, which in turn activates a vapor pump 40 coupled to the vapor return passage 32. The motor 38 may be a constant speed or variable speed motor. When the motor 38 activates the vapor pump 40, a suction is created in the vapor return passage 32, and vapor 30 expelled from the vehicle fuel tank 22 is drawn into the spout 14 of the nozzle 16 and into the vapor return passage 32. The vapor 30 then flows back to a ullage area 28 of the UST 24. The ullage area 28 is the portion of the storage tank that does not contain volatile liquid 26. More information on vapor recovery systems in the service station environment can be found in U.S. Pat. Nos. Re 35,238; 5,040,577; 5,038,838; 5,782,275; 5,671,785; 5,860,457; and 6,131,621, all of which are incorporated herein by reference in their entireties.

A tank vent line or pipe 41 is also coupled to the UST 24, and more particularly to the ullage 28 of the UST 24. The tank vent line 41 is coupled to an inner vent pipe 50 that runs into the inside of a canister 42 filled with hydrocarbon adsorbing activated carbon (carbon canister). When UST 24 pressure rises slightly above ambient, fuel vapors 30 and air enter into the carbon canister 42 where hydrocarbons are adsorbed onto the activated carbon. The cleansed air vents through a controlled flow outlet port and through a flow-limiting orifice with a known calibrated flow rate that vents in a controlled fashion to atmosphere. The removal of fuel vapor 30 and air from the UST 24 system limits pressure in the UST 24 system and prevents excessive positive pressure from occurring. The activated carbon is purged of hydrocarbons by means of reverse air flow caused by negative UST 24 pressures that occur during periods of ORVR vehicle refueling. A typical pressure/vacuum (P/V) relief valve 44 is provided with a vent port 46 to atmosphere as a normal safety measure in the event that the carbon canister 42 cannot prevent excess pressures from occurring in the UST 24.

As fueling resumes or traffic increases at the GDF, the pressure in the UST 24 will become negative due to removal of liquid fuel and a deficit of returned vapors from ORVR equipped vehicles. Air from the outside atmosphere will enter the carbon canister 42 via its outlet port (illustrated in FIG. 2) (now acting as an inlet) through the calibrated orifice at a controlled rate and will collect (purge) hydrocarbons from the activated carbon in the carbon canister 42 and return the hydrocarbons back to the ullage space 28 of the UST system via the inlet port inside the canister (illustrated in FIG. 3) (now acting as an outlet) and UST vent pipe 41. Once sufficient air has passed back through the carbon canister 42 to adequately purge the activated carbon of hydrocarbons, the carbon canister 42 will be prepared to once again repeat the process when the vehicle traffic declines and the pressure in the UST 24 rises. This process normally proceeds in a diurnally cyclical manner.

This solution is small, low cost and is easily installed without requiring electrical power or any controlling mechanisms. Bidirectional flow, including purging, is driven passively by the normal positive and negative pressures that occur in UST systems, typically in a diurnal cycling manner. The carbon canister 42 requires little or no maintenance and has a very long working life.

The carbon canister 42 is mounted at any convenient location where there is access to the vapor space 28 (ullage space) of the UST system such as on or near the UST vent pipe 41. The vent pipe 41 may be 2 inches in diameter, for example. The carbon canister 42 is connected to the UST vapor space 28 by any convenient means, such as a piping connection to the vent pipe 41 via a conduit, tubing or other means.

Figure 2:
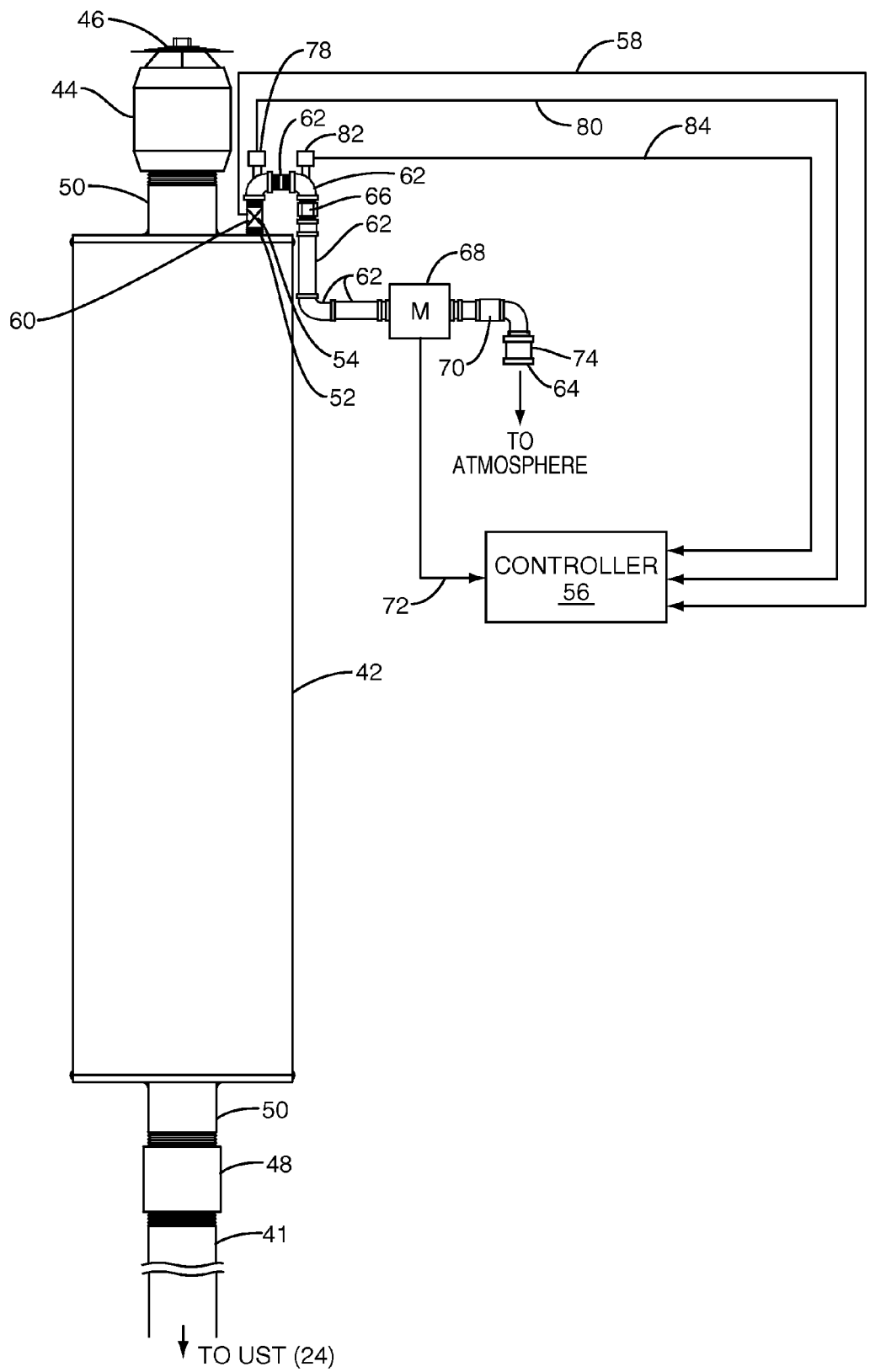
FIG. 2 is a more detailed illustration of the carbon canister and its supporting components.

The preferred embodiment is illustrated in FIG. 2, and is a simple, easy to manufacture design that mounts conveniently and out of the way at the top of a vent pipe 41, between the pipe 41 and the P/V relief valve 44. The canister 42 may be mounted closer to ground level by adding vent piping 41 length above the canister 42 and adding a vertical piping section 62 to an outlet port 52 so as to vent cleansed air up near the P/V relief valve 44 height.

Figure 3:
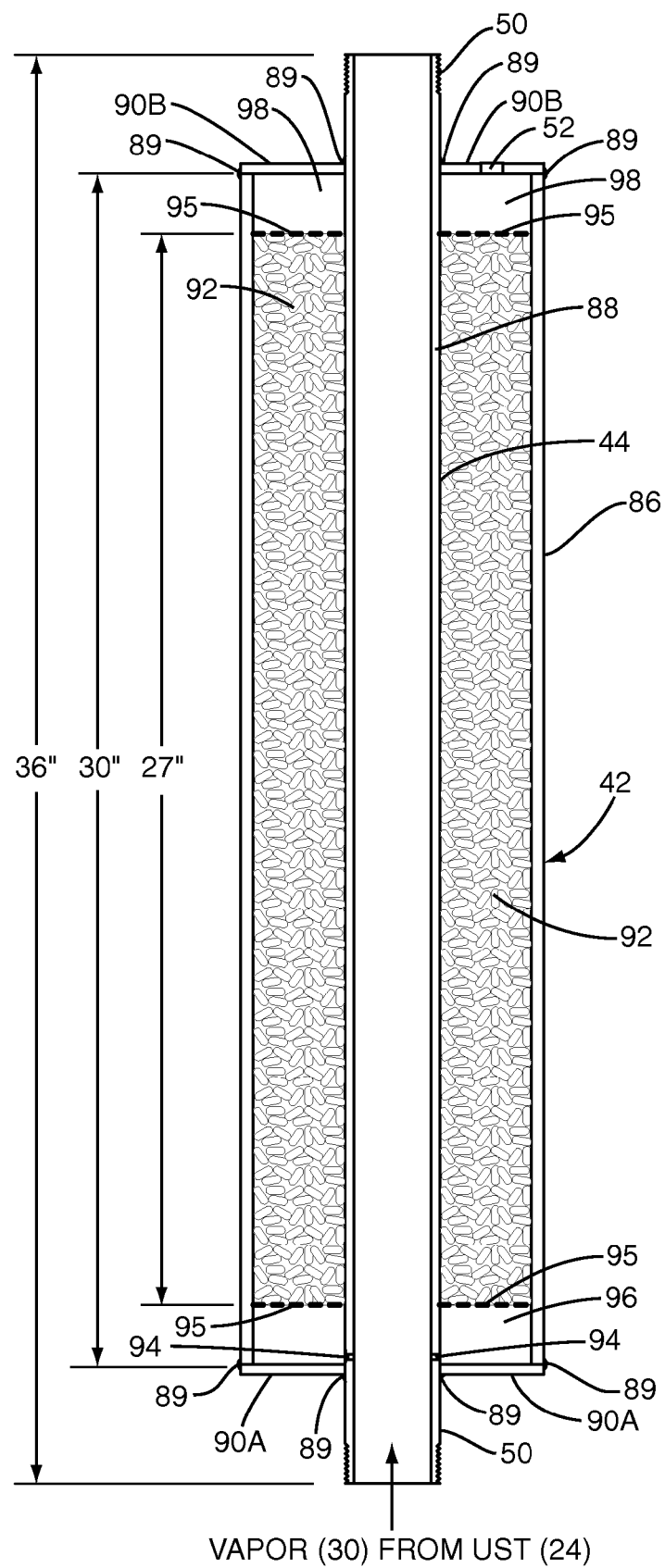
FIG. 3 is an illustration of a cross section view of the carbon canister illustrated in FIGS. 1 and 2.

As illustrated in FIG. 2, vapor 30 leaving the ullage 28 of the UST 24 enters into the vent pipe 41 and travels past a coupling 48 into the inner vent pipe 50 of the canister 42. The vapor/air or hydrocarbon air mixture is then cleansed inside the canister 42, and the cleansed air is released through an outlet port 52 of the canister 42 eventually to atmosphere. An optional solenoid operated control valve 54 may be provided which is coupled to the outlet port 52 and is under control of a controller 56, such as a site controller, tank monitor, or any other control system, that gives the controller 56 the ability to send a signal over a signal line 58 to turn vapor and air flow through the carbon canister 42 on and off based on feedback from a pressure sensor or pressure switch installed somewhere in the ullage space 28 of the UST 24, or in the vent pipe 41 or its path. The solenoid operated control valve 54 may also be coupled to the inlet port in the canister (inlet port 94 is illustrated in FIG. 3) to perform the same function.

Valving control to turn on and off vapor and air flow through the canister 42 provides the ability to isolate the carbon canister 42 from the UST 24 containment system. This is important in California where regulations now require GDFs to install Enhanced Vapor Recovery (EVR) systems with In-Station Diagnostics (ISD) monitors. As disclosed in commonly owned U.S. Pat. No. 6,622,757, incorporated herein by reference in its entirety, one of the ISD monitoring tests is a vapor leak test of the UST containment system. Since the carbon canister 42 is a vapor leak path, the ISD test can measure the leak and incorrectly issue a test fail result and alarm. The addition of the solenoid control valve 54 can serve to provide canister 42 off-time when the ISD test can be performed without risk of false alarm.

Further, an optional manually operated shut-off valve 60, such as a ball valve, may be provided in the same or similar location and in lieu of or in addition to the solenoid operated control valve 54 coupled to the outlet port 52, or coupled to the inlet port 94 of the carbon canister (illustrated in FIG. 3), that would give a service technician the ability to turn vapor 30 and air flow through the carbon canister 42 on and off. Similar to the solenoid operated control valve 54 embodiment, this would provide the ability to isolate the carbon canister 42 from the UST containment system, but in a manual fashion. This is important where regulations require a UST containment system vapor leak test to be run periodically or for diagnostic purposes. An example of this kind of test is the California TP-201.3 pressure decay test. Since the carbon canister 42 is a vapor leak path, the manual test will measure the effects of the leak which will incorrectly result in a test fail result. The addition of the manual shut-off valve 60 serves to eliminate this problem by allowing the service technician to shut off the canister 42 flow during a leak test. An alternate way to accomplish this is to use a threaded output pipe or fitting to which a plug or cap can be attached to seal off the outlet port 52 during a leak test.

Another embodiment that can serve to remedy the above mentioned ISD vapor leak test problem is provided by a mathematical adjustment to the leak test result. Since a calibrated flow orifice is used, the flow rate versus pressure is known to a reasonable degree of accuracy. This known leak rate is used as a baseline "zero" system leak condition and is subtracted off of the ISD measured "gross" leak rate to yield an accurate "net" leak rate for the rest of the UST containment system. This net rate is the desired result for satisfying the California ISD leak test requirement. This solution is cost-free and is therefore preferable to the solenoid valve approach for ISD leak rate testing needs.

The outlet port 52 may also consist of or be coupled to a tube 62 or conduit 62 containing joint tubing or conduit for eventual release of cleansed air to an outlet port 64 to atmosphere. The outlet port 64 may consist of a ¼ inch pipe and fittings. A flow-limiting orifice 66 is provided between the canister outlet port 52 and the outlet port 64 to atmosphere with a known calibrated flow rate that vents cleansed air in a controlled fashion to the outlet port 64 to atmosphere. The flow-limiting orifice 66 may be 0.089 inches in diameter, for example.

FIG. 2 also illustrates several other optional components that may be provided between the outlet port 52 of the canister 42 and the outlet port 64 on the outlet side of the flow-limiting orifice 66 to atmosphere that may enhance the functionality and/or operation of the system.

As illustrated in FIG. 2, an optional hydrocarbon (HC) sensor 78 may be mounted in the outlet port 52 flow path to measure the degree of HC cleansing achieved by the carbon canister 42. When the UST 24 and canister 42 are in a positive pressure condition, it is known that there is a cleansed air outflow past the HC sensor 78. The outflow HC concentration is then monitored by the controller 56, via a communication line 80, and compared to a pass/fail threshold to indicate whether the canister 42 is performing adequately or as needed. UST 24 (or canister 42) pressure may be measured by either adding a pressure sensor inside the UST 24, or coupled to the outlet port 52 as pressure sensor 82 coupled to the controller 56, via communication line 84, for that purpose, or by making use of an existing ISD monitoring pressure sensor, and optionally, its controller to perform the monitoring tasks. Note that an air sensor, such as a nitrogen or oxygen sensor, could also be used in place of the HC sensor 78. Examples of HC sensors 78 that may be used in the present invention are disclosed in U.S. Pat. Nos. 5,782,275; 5,843,212; 5,992,395; 6,460,579; 6,499,516; 6,644,360; and 6,712,101, all of which are incorporated by reference herein in their entireties.

An alternate way to determine flow direction in place of using a pressure sensor 82 (or pressure sensor inside the UST 24) is to add a bi-directional flow meter 68 in the flow path of the canister 42 at the inlet port 94 of the canister (illustrated in FIG. 3), or the outlet port 52. In the illustrated embodiment in FIG. 2, after the cleansed air leaves the flow-limiting orifice 66, the cleansed air enters into an optional bi-directional flow meter 68 that is coupled to the outlet port 52, via tubing 62, to measure the flow rate and/or direction of flow of the cleansed air on its way to the outlet port 64 to atmosphere during over-pressure conditions, or drawn into the outlet port 64 back into the canister 42, during under-pressure conditions. The meter 68 may be electronically coupled to the controller 56, via a communication line 72, so the controller 56 can determine the flow rate and direction of the flow of air.

In addition to providing for the above mentioned need, flow measurements from the meter 68 can also be used in combination with HC concentration measurements from the HC sensor 78 to estimate HC, cleansed air flow rates, total HC, and air emissions from the canister 42 to the atmosphere. The total amount of HC released by the canister through the outlet port 52 can be calculated as the HC concentration, as measured by the HC sensor 78, times the flow rate and time, or volume of flow, as measured by the meter 68. Any of these parameters may be compared to pass/fail thresholds to monitor canister 42 performance and to indicate whether the canister 42 is performing adequately or as needed, since if too much HCs are entering the outlet port 52, the carbon inside the canister 42 is either saturated or the canister 42 is not working properly, and alarms and/or reports can be generated in response thereto. The flow meter 68 may also be used to measure incoming purging air flow rates and amounts to determine whether there is adequate purging for the amount of HC cleansing occurring.

Pressure measurements, as described above from pressure sensor 82 or UST ullage 28 or any other vent pressure sensor, can be combined with the known flow versus pressure characteristics of the flow-limiting orifice 66 to estimate bidirectional flow rates through the canister 42, which can be used in place of flow rates from an added flow meter 68 for the same purposes. This method provides the same capabilities but at a lower cost by eliminating the need for a separate flow meter.

Similarly, HC emissions estimations can be accomplished without the addition of an HC sensor 78 by mathematically modeling the known HC loading and purging characteristics of the activated carbon particles or pellets 92 shown in FIG. 3. Amounts of HC's in the vapor 30 stream entering the canister 42 are estimated by using the measured flow rates and assumed or estimated HC concentration in the incoming HC and air mixture. This concentration can be estimated using well known HC in air saturation characteristics with respect to temperature. Temperature of the mixture can be assumed, for instance based on location and date or season of the year. Alternatively, it can be measured either with (typically) existing ATG tank probe temperature sensors in the ullage space 28 or by adding an optional temperature sensor for this purpose in the ullage space 28 or vapor 30 flow stream into the canister 42. As the vapor 30 mixture enters the canister 42, the estimated total amount of HC's is compared to the loading and capacity characteristics of the carbon 92 to maintain a continuous estimation of the HC load in the canister 42 for instance as total mass of HC's or as a percent of total carbon 92 capacity. If the HC load gets too near or reaches capacity, an alarm can be issued or the optional solenoid operated control valve 54 can be closed to prevent HC emissions or both. Alternatively, limited emissions can be allowed depending on regulatory guidelines after capacity is reached. In this instance, the issuing of the alarm and/or the closing off the valve 54 is delayed until the allowed emissions limit is reached. The ability to prevent or limit HC emissions based on flow and optional temperature measurements combined with mathematically modeled loading estimations to control the valve 54, can be used to avoid the costly addition of an HC sensor 78, since emissions cannot then normally occur.

When the optional valve 54 is in the closed state and pressure drops below zero gauge pressure or below a selected negative gauge pressure, for instance, −0.25 inches of water column relative to atmosphere, the valve 54 can be reopened to let normal carbon 92 purging occur.

As an adjunct to carbon 92 HC load modeling, carbon 92 HC purge modeling is included. Purge modeling is done by measuring the purge air inflow to the canister 42 during periods of negative ullage pressure and using the known purging characteristics of the carbon 92. Using the flow and known purge characteristics, amounts of HC's purged from the carbon 92 are mathematically estimated and subtracted from the current HC load to maintain an accurate, ongoing estimation of the total load.

Both load modeling and purge modeling together are needed to maintain a continuous estimation of carbon 92 load conditions for multiple load and purge cycles.

During purging, when the estimated HC load becomes zero or near zero, no further purging is needed. At that point, the optional solenoid valve 54 can be closed to prevent any further air from entering the ullage space 28 of the UST's 24, since excess air can cause unwanted fuel evaporation and associated pressure rise in the UST's 24.

When the optional valve 54 is in the closed state and pressure rises above zero gauge pressure, or a selected threshold above zero, for instance, +0.25 inches of water column relative to atmosphere, the valve 54 can be reopened to let normal carbon 92 loading resume to control excess UST 24 pressure.

After the cleansed air leaves the flow-limiting orifice 66 and meter 68, if provided, on its way to being released to atmosphere via the outlet port 64, an optional debris filter 70 may be provided inline in the tubing 62 coupled to the inlet side of the outlet port 64 to atmosphere to prevent contamination as well, as illustrated in FIG. 2. The debris filter 70 serves to prevent contamination of activated carbon inside the carbon canister 42, and also to prevent contamination of the flow-limiting orifice 66, and flow meter 68, if provided. A debris filter (not shown) may also be provided between the inlet port 94 (illustrated in FIG. 3) and the chamber inside the canister 42 to prevent contamination as well.

Lastly, there is an optional ¼ inch coupling rain shield and screen 74 that prevents rain water from entering the outlet port 64. The rain shield and screen 74 actually forms the outlet port 64 to atmosphere in the illustrated embodiment.

FIG. 3 illustrates a cross-sectional view of the canister 42 in accordance with one embodiment of the present invention so that its internal components are illustrated in more detail. As illustrated in FIG. 3, the canister 42 is formed by the inner vent pipe 50 that is coupled to the vent pipe 41 via the coupling 48, as illustrated in FIG. 2, within an outer pipe 86. The inner vent pipe 50 may be Schedule 80 two-inch water pipe, for example. The inner vent pipe 50 provides a vent path extension through the center of an outer, larger diameter pipe 86, which may be Schedule 40 seven-inch water pipe, for example. The top and bottom end disc-shaped plates 90A, 90B or caps complete an enclosed canister chamber. The top and bottom end plates 90A, 90B, which may be ¼ inch thick steel, are sealed with air tight welds at locations 89 where the plates 90 contact the outer and inner pipes 86, 50.

The activated carbon particles or pellets 92 are located in the annular space chamber between the two pipes 50, 86. For example, it may be necessary to include 15 Liters of carbon pellets 92 in order to properly adsorb HCs from the UST 24, but any amount desired can be provided. An inlet port function is provided by one or more holes 94, which may be 3/16 inches in diameter, surrounding the inner vent pipe 50 near the bottom of the chamber. Providing the inlet ports 94 at the bottom of the chamber allows any condensation that occurs to more easily drain back the ullage 28 via the vent pipe 41. The outlet port 52 is simply a hole in the top end plate 90B where an outlet tubing or conduit 62 and fittings 62 are mounted along with the calibrated orifice 66 (see FIG. 2). Top and bottom perforated retaining screens 95 or plates 95 inside the chamber provide inlet and outlet manifold spaces 96, 98 to route the air and vapors to and from the activated carbon 92. They also hold the carbon 92 in place and prevent the particles or pellets 92 from entering the manifold spaces 96, 98.

In the embodiment illustrated in FIG. 3, the inlet port 94 for vapor 30 to enter from the vent pipe 41 into the carbon 92 for cleansing is provided as an integral part of an inner vent pipe 50 that is directly coupled to the vent pipe 41 itself. Thus, this provides a cost effective manner in which to install the canister 42 to a vent pipe 41, since the inner vent pipe 50 is attached directly to the end of the vent pipe via the coupling 48. A separate tubing that couples the internal space of the vent pipe 41 to the inlet port of the canister 94 is thus not required. However, the inlet port of the canister 94 can be coupled to the vent pipe 41 by other methods that are within the scope and spirit of the present invention. For example, the canister 42 may be attached as a separate device to outside of the vent pipe 41 via a strap for example, and the inlet port of the canister coupled to the space inside the vent pipe 41 where vapors 30 reside via a coupling or tubing (not shown). In this alternative configuration, the inner pipe 50 is not needed. The canister enclosure is then formed with a single outer pipe 86 and end caps 90A and 90B, but without an inner pipe 50.

Figure 4:
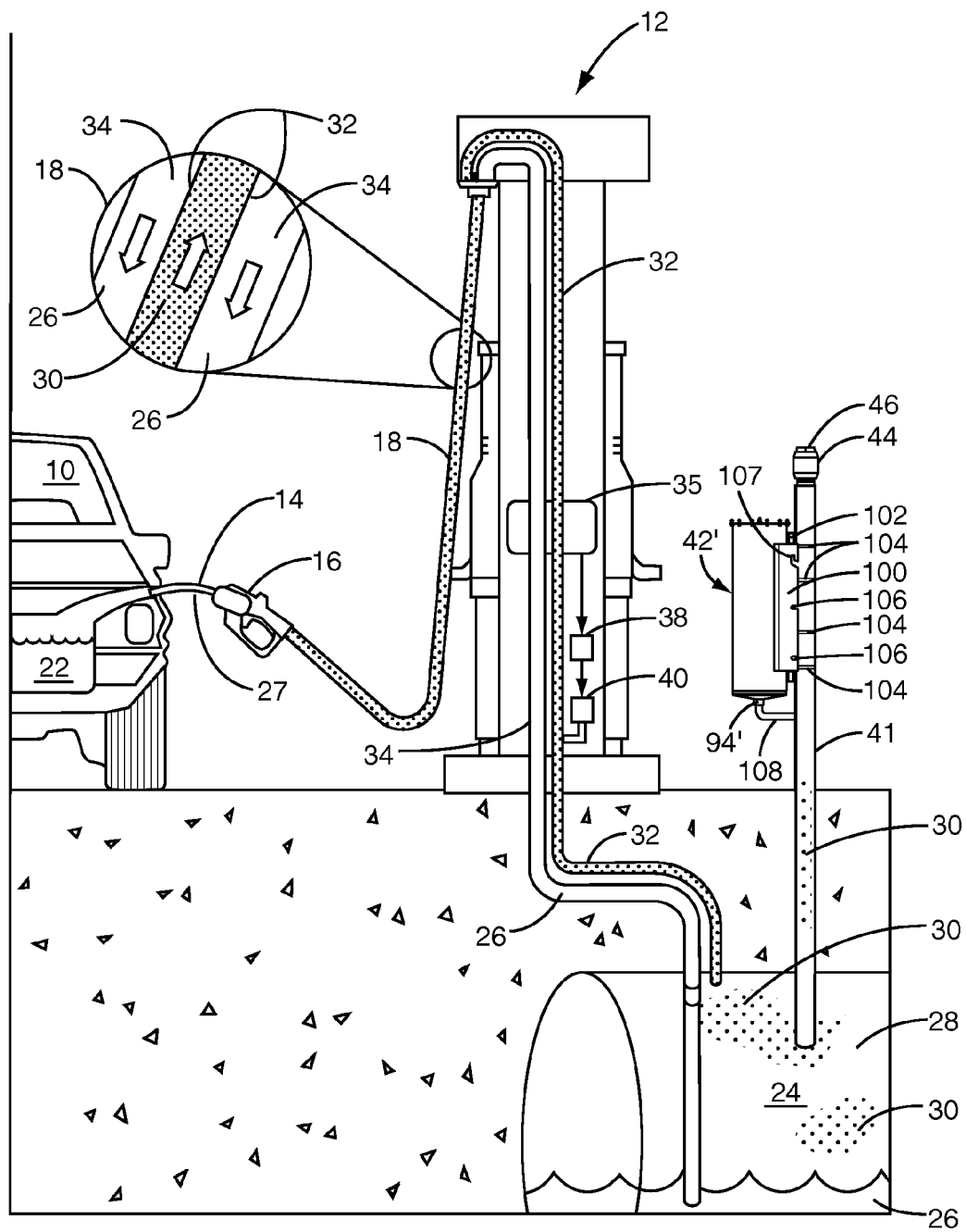
FIG. 4 is an illustration of a Stage II vapor recovery-equipped fuel dispenser and fuel storage tank in a service station environment employing a carbon canister in accordance with an alternative carbon canister embodiment of the present invention.

FIG. 4 illustrates an alternative carbon canister 42' that may be employed in the present invention. In this embodiment, the carbon canister 42' is attached to the outside of the vent pipe 41 to couple the canister 42' to the UST 24. This is opposed to the carbon canister 42 illustrated in FIGS. 1-3 that contained an inner vent pipe 50 coupled to the vent pipe 41. The Stage II vapor recovery-equipped fuel dispensing system illustrated in FIG. 4 is similar to that illustrated in FIG. 1 and previously described above. The description of the service stations components for FIG. 1 is equally applicable for FIG. 4 and thus will not be repeated here.

The alternative carbon canister 42' is attached to the outside of the UST vent pipe 41 via an adapter plate 100 that is attached to a clamp support 102. The clamp support 102 is physically attached to the vent pipe 41 via one or more U-bolts 104. The adapter plate 100 has indentions or orifices 107 that are designed to receive bolts 106 attached to the clamp support 102 to secure the adapter plate 100 to the clamp support 102. Because the clamp support 102 is attached to the vent pipe and the canister 42' is attached to the adapter plate 100, the canister 42' is physically secured to the vent pipe 41.

Figure 6:
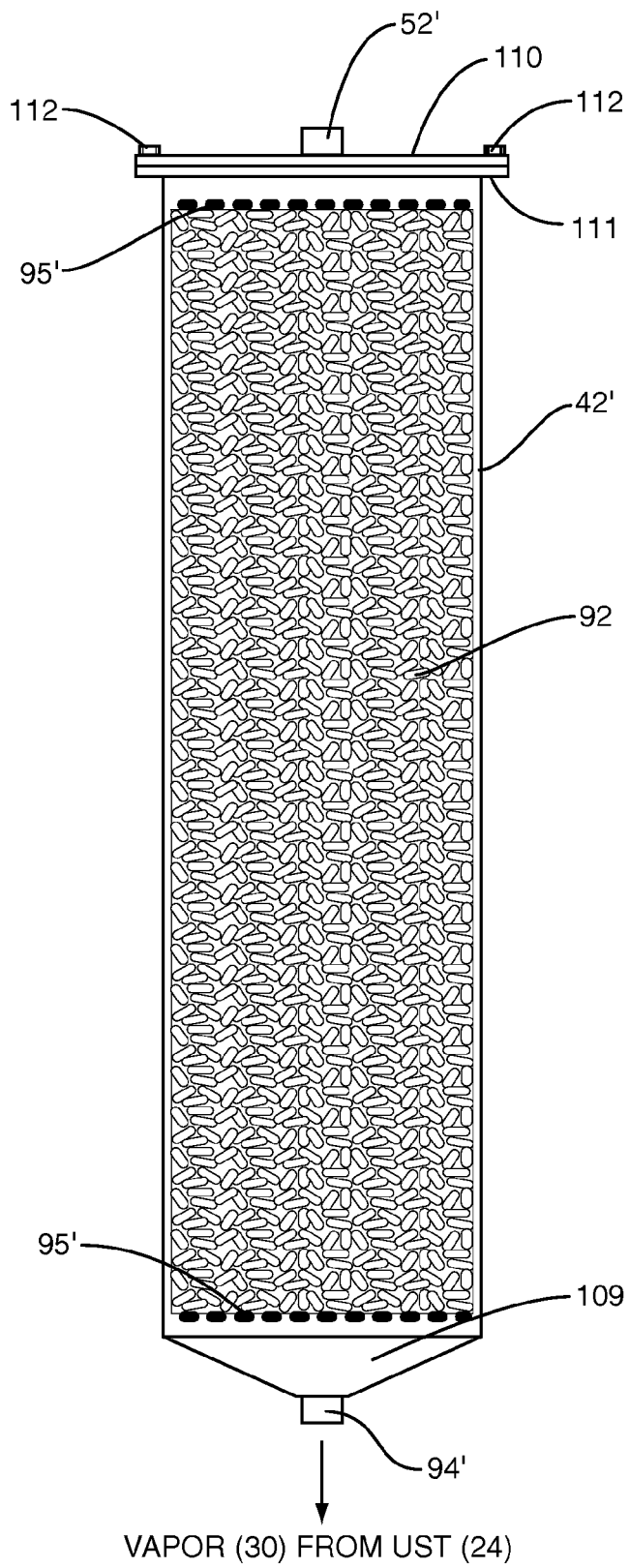
FIG. 6 is an illustration of a cross section view of the alternative carbon canister illustrated in FIGS. 4 and 5.

The canister 42' contains an inlet port 94' for the hydrocarbon air mixture or vapor 30 from the UST 24 to enter and pass across the hydrocarbon adsorbing carbons (element 92 in FIG. 6). The inlet port 94' is coupled to the vent pipe to receive the vapors 30 via a tubing or conduit 108 as illustrated. Cleansing of vapor 30 from the UST 24 and purging the hydrocarbons from the carbon 92 in the canister 42' may be performed just as previously discussed for the canister 42 illustrated in FIGS. 1-3.

Figure 5:
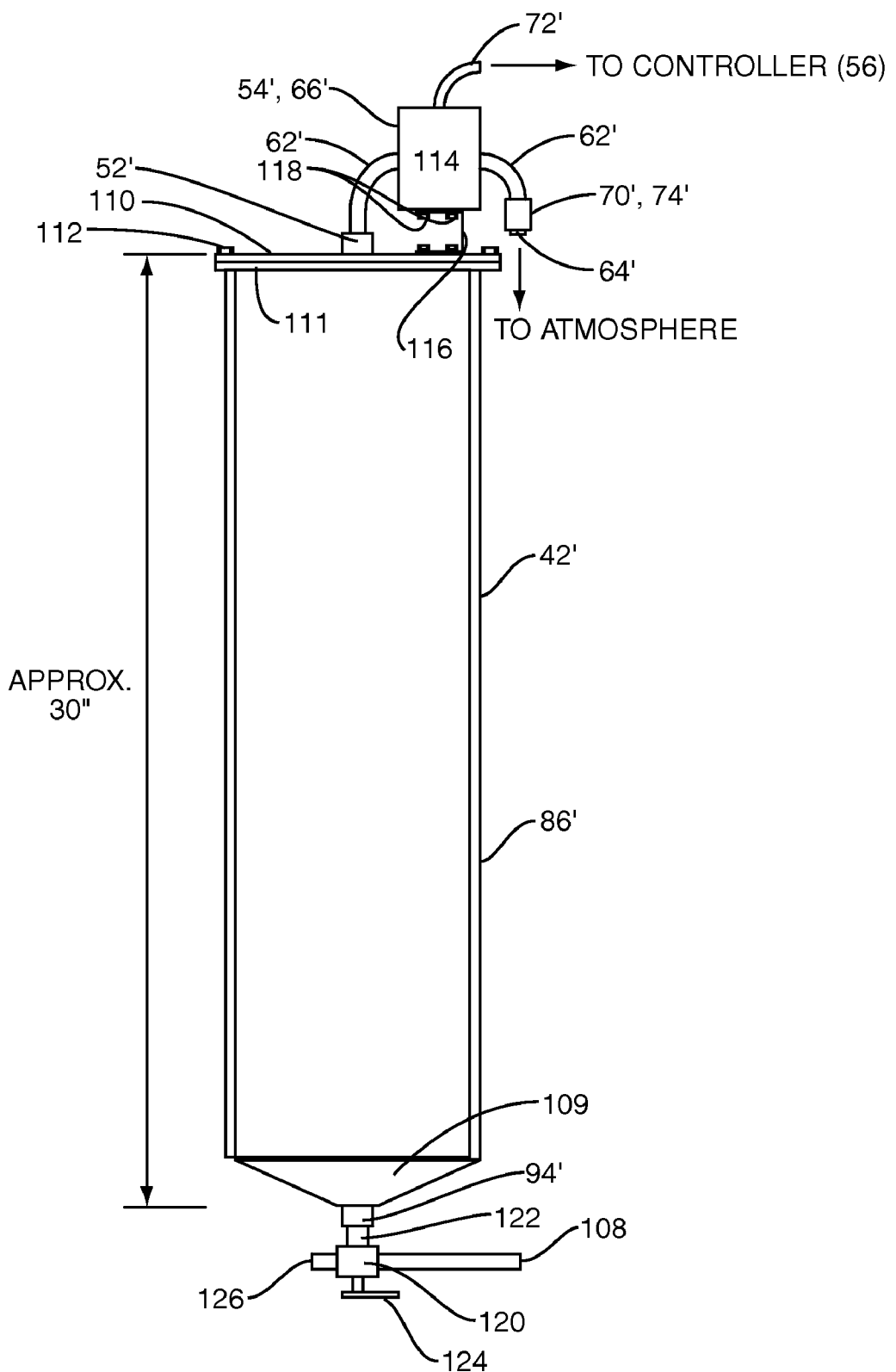
FIG. 5 is a more detailed illustration of the alternative carbon canister and its supporting components.

FIG. 5 illustrates more components and features of the alternative carbon canister 42' illustrated in FIG. 4. The carbon canister 42' is comprised of a cylindrical-shaped outer container or piping 86'. A canister bottom 109 and a canister lid 110 are attached to the ends of the container or piping 86' to seal the canister 42'. The canister lid 110 is attached to a flange 111 that is formed as part of the canister container 86' via bolts 112. Hydrocarbon adsorbing carbon (element 92 in FIG. 6) is located inside the canister 42' just as the canister 42 illustrated in FIGS. 1-3. The inlet port 94' is provided in the canister bottom 109 to allow the vapor 30 from the UST 24 to enter and the return of purged hydrocarbons back to the UST 24.

Just as for the carbon canister 42 discussed and illustrated in FIGS. 1-3, the alternative canister 42' contains an outlet port 52' that either vents a substantially cleansed air to atmosphere, or receives outside air for purging. A control manifold 114 is provided that contains the solenoid operated control valve 54', the flow-limiting orifice 66', and an interface to the communication line 72' from the controller 56, such as a tank monitor or site controller, to control the valve 54' for controllably venting cleansed air and receiving outside purging air. The control manifold 114 is attached to the canister lid 110 via a U-shaped bracket 116 and bolts 118 that provides for some flexible movement of the control manifold 114 via bending of the bracket 112. The control manifold 114 is coupled to the outlet port 52' of the carbon canister 42' via tubing 62'. The outlet of the solenoid valve 54' and flow-limiting orifice 66' may be coupled to a debris filter 70' and/or a rain screen 74' via tubing 62' as well. In summary, the alternative canister 42' contains common elements with the canister 42 illustrated in FIGS. 1-3 with the same operation and features as previously described.

In the alternative canister 42', a three-way valve 120 is also provided to control the opening and closing of the inlet port 94'. The three-way valve 120 is coupled to the inlet port 94' via a tube or piping 122. The three-way valve 120 allows the canister 42' to be isolated from the UST vent pipe 41 for operability and leak testing of the canister 42' to ensure that the canister 42' is properly operating and does not contain leaks. A handle 124 is provided that allows one to manually control the valve 120 setting. In a first position, the valve 120 couples the inlet port 94' to the vent pipe 41 via tubing 108 to adsorb hydrocarbons and return purged hydrocarbons to the UST 24 in a normal operating mode. However, the handle 124 can also close the valve 120 to isolate the canister 42' completely. The handle 124 can also place the valve 120 in a third position to couple the inlet port 94' to a test port 126 for testing of the canister 42'. Alternatively, the handle 124 can combine the closing of the valve 120 to isolate the canister 42' and couple the inlet port 94' to a test port 126 simultaneously in a single step.

In order to validate that the canister 42' flow versus pressure drop characteristics are within correct operating ranges to ensure the flow-limiting orifice 66', the solenoid valve 54', and/or the filters 70', 74' are not clogged or adversely affecting use of the orifice and pressure measurement as an accurate flow measurement means, a controlled nitrogen or other type of air source (not shown) may be connected to the test port 126 when the handle 124 is set to the test port 126 position. In this manner, flow/pressure testing can be performed on the canister 42'. Also, the solenoid valve 54' can be closed and the canister 42' pressurized with the nitrogen or other air to show that the canister 42' can hold pressure without leaking. These tests may be needed as annual "operability tests" or "leak tests" for California or other regulatory body certification requirements.

In order to conduct the operability test, a test procedure is performed. First, the three-way valve 120 is set to the test position by engaging the handle 124. This couples the inlet port 94' of the canister 42' to the test port 126 and isolates the canister 42' from the vent pipe 41. The controller 56 directs the solenoid valve 54' to open by command over the communication line 72' via automated or operator controlled input to the controller 56, such as through a tank monitor keypad for example. This simulates the operating mode of the carbon canister 42' when normally coupled to the UST 24. The nitrogen or other air source is then connected to the test port 126, and nitrogen is allowed to flow into the canister 42' via the inlet port 94'. For example the flow may be 18 cfh. The pressure at the test port 126 is then measured to determine if the flow-limiting orifice 66' and the components coupled to the outlet port 52' of the canister 42 are properly operating and/or not clogged. If the pressure at the test port 126 is outside the expected range, which may be between 2" w.c. +−0.2" w.c. for example, the operability test fails.

If the test does not fail, a leak test can also be performed to ensure that the canister 42' does not contain a leak. In this instance, the leak test is most logically performed following a successful operability test since a controlled nitrogen or other air source is required to pressurize the canister 42'. The controller 56 closes the solenoid valve 54' to close via automated or manual control. The carbon canister 42' is then pressurized at the test port 126 and an external valve (not shown) in-line with the nitrogen source is closed when the desired pressurization level for testing is reached, which may be 5 to 6" w.c. for example. The pressure drop rate is then measured at the test port 126. If the pressure drops or decays more than an expected value or rate, for example more than 1" w.c. in five minutes or less (i.e. >0.01 cfh at 2" w.c. for example), the leak test is deemed to have failed. Pressure loss is occurring as a result of an unacceptable leak in the canister 42'. It should be noted that the operability and leak tests may also be performed on any variation of the canister 42, 42'. The three-way valve 120 may also be employed with the first canister 42 discussed above and illustrated in FIGS. 1-3.

FIG. 6 illustrates a cross section of the alternative canister 42' just to illustrate the differences from the carbon canister 42 illustrated in FIG. 1-3. As illustrated, there is no inner pipe in the canister 42' in FIG. 6. Only one chamber is provided to hold the carbon 92. The top and bottom retaining screens 95' are still provided just as in the canister 42 illustrated in FIGS. 1-3, to direct the vapor 30 through the carbon 92 and to direct received outside air and purged hydrocarbon back to the UST 24.

Figure 7A:
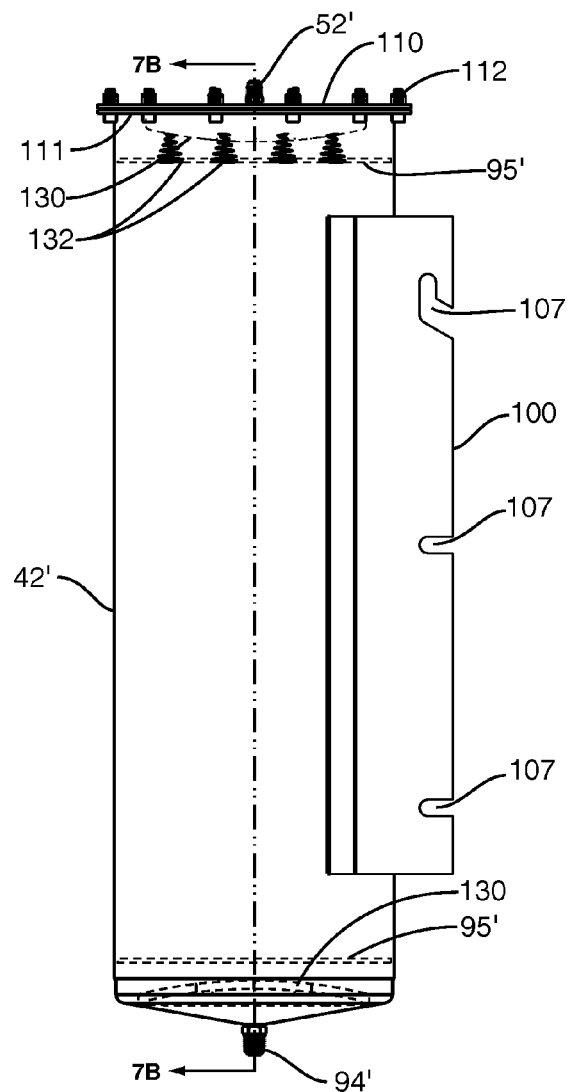
FIGS. 7A-7B are illustrations of some internal components of the alternative carbon canister to provide diffusing and packing of the carbon inside the carbon canister.
Figure 7B:
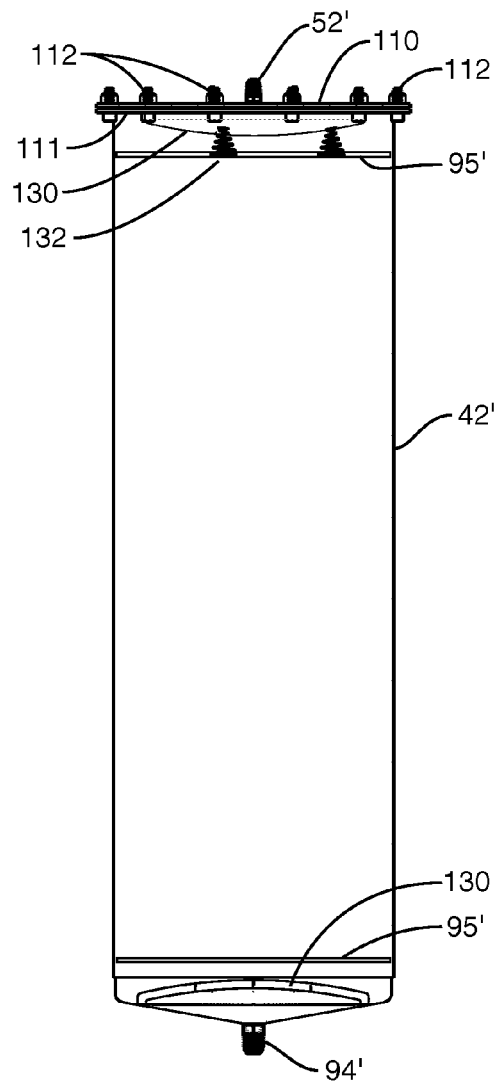

FIGS. 7A-7B illustrates some additional and optional components that may be used internal to the canister 42, 42' for providing enhanced operability and performance. FIGS. 7A and 7B illustrate these internal components of the canister 42'. First, a diffuser 130 may be provided at the top and/or bottom of the canister 42' outside the retaining screens 95' to diffuse vapors 30 entering into the inlet port 94' on their way to the carbon 92 for hydrocarbon adsorption, or outside air entering into the outlet port 52' on its way to the carbon 92 for hydrocarbon purging. Diffusers 130 may more evenly spread the air flow to the carbon 92 to provide for greater adsorption and/or purging between the carbon 92 for greater performance and/or greater hydrocarbon load. Uneven air flow across the carbon 92 may result in carbon 92 located closer to the middle inside the canister 42' become saturated before carbon 92 located on the edges inside the canister 42' thereby resulting in an effectively reduced overall hydrocarbon load. Further load and purge modeling may depend on the carbon characteristics that may not be as expected if the carbon 92 inside the canister 42' has uneven adsorption and purge rates.

Packing the carbon 92 tightly together inside the canister 42' may also improve hydrocarbon adsorption so that vapors 30 from the UST 24 are more likely to pass across densely located carbon 92 as opposed to possible seepage areas resulting from less densely packed carbon 92. In this manner, one or more springs 132 are provided internally at the top of the canister 42' between the canister lid 110 and the retaining screen 130. When the canister lid 110 is attached to the canister 42' after carbon is loaded inside, the springs 132 push on the retaining screen to in turn push on the carbon 92 inside. This has the effect of tightly packing the carbon 92 together inside the canister 42. It should be noted that the diffuser 130 and springs 132 may also be used on the canister 42 illustrated in FIGS. 1-3.

Those skilled in the art will recognize improvements and modifications to the preferred embodiments of the present invention. All such improvements and modifications are considered within the scope of the concepts disclosed herein and the claims that follow.

We claim:

1. A system for managing pressure in a fuel storage tank to prevent fugitive emissions, comprising:
   a carbon canister, comprising:
      a canister having an inlet port and an outlet port wherein the inlet port is coupled to the fuel storage tank; and
      hydrocarbon adsorbing activated carbon located inside the canister;
   a flow limiter coupled to the outlet port of the carbon canister to control a flow rate of air flow exiting from and entering into the outlet port of the carbon canister;
   wherein when the fuel storage tank is overpressurized, a hydrocarbon air mixture from the fuel storage tank enters into the inlet port of the carbon canister and the carbon adsorbs hydrocarbon in the hydrocarbon air mixture leaving a substantially cleansed air residual from the hydrocarbon air mixture that is vented through the outlet port and the flow limiter; and
   wherein when the fuel storage tank is underpressurized, outside air enters through the flow limiter and into the outlet port and the hydrocarbon adsorbed by the carbon is purged and returned back to the fuel storage tank.

2. The system of claim 1 wherein only a pressure differential between the fuel storage tank and the outlet port causes the hydrocarbon air mixture to enter into the inlet port of the carbon canister and the outside air to enter into the outlet port of the carbon canister.

3. The system of claim 1, wherein the carbon canister further comprises an inner vent pipe surrounded by an outer pipe, wherein the carbon is contained in a space formed between the inner vent pipe and the outer pipe.

4. The system of claim 3, wherein the inner vent pipe is coupled to a vent pipe coupled to the fuel storage tank to couple the carbon canister to the fuel storage tank.

5. The system of claim 1, further comprising:
   a pressure sensor operatively coupled to a control system and to the fuel storage tank to measure the pressure inside the fuel storage tank; and
   a valve coupled to the control system and to the outlet port of the carbon canister wherein the control system controls the opening and closing of the valve to control the opening and closing of the outlet port;
   wherein the control system is adapted to:
      measure the pressure in the fuel storage tank using the pressure sensor; and
      control the opening and closing of the valve to control the venting of the cleansed air residual through the outlet port of the carbon canister and control the receiving of the outside air through the outlet port of the carbon canister based on the pressure in the fuel storage tank.

6. The system of claim 5, wherein the control system opens the valve to allow the venting of the cleansed air residual through the outlet port of the carbon canister and the receiving of the outside air through the outlet port of the carbon canister, when the fuel storage tank is overpressurized or underpressurized.

7. The system of claim 5, wherein the control system closes the valve to disallow the venting of the cleansed air residual through the outlet port of the carbon canister and the receipt of the outside air through the outlet port of the carbon canister when the fuel storage tank is not overpressurized or underpressurized.

8. The system of claim 5, wherein the valve is a solenoid operated control valve.

9. The system of claim 5, wherein the control system closes the valve to isolate the carbon canister from the fuel storage tank when performing a leak test on the fuel storage tank.

10. The system of claim 5, wherein the control system is further adapted to determine a net leak rate of the fuel storage tank by subtracting a known leak rate of a flow limiter from a measured gross leak rate of the fuel storage tank.

11. The system of claim 5, wherein the control system is further adapted to measure or estimate hydrocarbon concentration or lack of hydrocarbon concentration of the vented cleansed air residual through the outlet port of the carbon canister to determine a degree of adsorption by the carbon inside the carbon canister.

12. The system of claim 11, wherein the control system is further adapted to:
measure a flow rate of the cleansed air residual passing through the outlet port of the carbon canister; and
multiply the measured or estimated hydrocarbon concentration or lack of hydrocarbon concentration, respectively, times the flow rate of the cleansed air residual to determine a total hydrocarbon or air emissions from the outlet port of the carbon canister.

13. The system of claim 5, further comprising a sensor coupled to the outlet port of the carbon canister to measure or estimate the hydrocarbon concentration or lack of hydrocarbon concentration in the outlet port,
wherein the control system is further adapted to measure or estimate the hydrocarbon concentration or lack of hydrocarbon concentration of the vented cleansed air residual by using the sensor measurement.

14. The system of claim 11, wherein the control system is further adapted to close the valve if the hydrocarbon concentration or lack of hydrocarbon concentration of the vented cleansed air residual through the outlet port indicates a degree of adsorption that indicates the carbon is at or near adsorption capacity.

15. The system of claim 11, wherein the control system is further adapted to generate an alarm or report if the hydrocarbon concentration or lack of hydrocarbon concentration of the vented cleansed air residual through the outlet port indicates a degree of adsorption that indicates the carbon is at or near adsorption capacity or the carbon canister is not properly adsorbing the hydrocarbons from the hydrocarbon air mixture.

16. The system of claim 5, wherein the control system is further adapted to determine a hydrocarbon load of the carbon in the carbon canister by:
measuring or estimating the flow rate of the hydrocarbon air mixture entering the inlet port of the carbon canister;
measuring or estimating the hydrocarbon concentration of the hydrocarbon air mixture entering into the inlet port; and
estimating the hydrocarbon load of the carbon in the carbon canister based on the measured or estimated flow rate and the measured or estimated hydrocarbon concentration of the hydrocarbon air mixture entering the inlet port of the carbon canister.

17. The system of claim 16, wherein the control system is further adapted to estimate the hydrocarbon load of the carbon in the carbon canister by comparing the measured or estimated flow rate and the measured or estimated hydrocarbon concentration of the hydrocarbon air mixture entering the inlet port of the carbon canister with known loading characteristics of the carbon in the carbon canister.

18. The system of claim 17, wherein the control system is further adapted to generate an alarm or report or close the outlet port if the hydrocarbon load of the carbon reaches its load capacity or approximate load capacity.

19. The system of claim 17 wherein the control system is further adapted to generate an alarm or report or close the outlet port when the hydrocarbon load of the carbon exceeds its total capacity and an allowed emissions amount.

20. The system of claim 16, wherein the control system is further adapted to measure or estimate the hydrocarbon concentration of the hydrocarbon air mixture entering the inlet port by:
measuring or estimating a temperature of the hydrocarbon air mixture entering the inlet port of the carbon canister; and
determining the hydrocarbon concentration of the hydrocarbon air mixture entering the inlet port using a known relationship between the temperature and the hydrocarbon saturation of the hydrocarbon air mixture.

21. The system of claim 16, wherein the control system is further adapted to measure or estimate the flow rate of the hydrocarbon air mixture entering the inlet port of the carbon canister by:
measuring the flow rate of the cleansed air mixture exiting the outlet port; and
increasing the flow rate of the cleansed air mixture exiting the outlet port based on the hydrocarbon concentration of the hydrocarbon air mixture entering the inlet port.

22. The system of claim 16, wherein the control system is further adapted to determine the hydrocarbon load of the carbon in the carbon canister by:
measuring the flow rate of the received outside air through the outlet port of the carbon canister;
estimating the amount of hydrocarbon purged from the carbon in the carbon canister using the flow rate and the known purge characteristics of the carbon; and
subtracting the amount of hydrocarbon purged from the carbon from the hydrocarbon load of the carbon in the carbon canister.

23. The system of claim 17, wherein the hydrocarbon load of the carbon comprises either a total mass of hydrocarbons adsorbed by the carbon or a percentage of hydrocarbon capacity adsorbed by the carbon.

24. The system of claim 22, wherein the control system is further adapted to close the outlet port of the carbon canister when the hydrocarbon load of the carbon is zero or approximately zero to prevent excess air from entering into the carbon canister to prevent unwanted fuel evaporation and pressure rise in the fuel storage tank.

25. The system of claim 5, wherein the control system is further adapted to measure the amount of cleansed air vented through the outlet port or outside air entering the outlet port.

26. The system of claim 25, further comprising a meter coupled to the outlet port and coupled to the control system to report the amount of cleansed air vented through the outlet port or outside air entering the outlet port.

27. The system of claim 25, wherein the control system is further adapted to measure the amount of cleansed air vented through the outlet port or outside air entering the outlet port by measuring the flow rate of the amount of cleansed air vented through the outlet port or outside air entering the outlet port using pressure of the fuel storage tank to estimate the flow rate using known pressure versus flow rate characteristics.

28. The system of claim 25, wherein the control system reports the amount of cleansed air vented through the outlet port or outside air entering the outlet port to another system.

29. The system of claim 28, wherein the control system is further adapted to generate an alarm or report if the amount of cleansed air vented through the outlet port or outside air entering the outlet port differs from an expected value.

30. The system of claim 1, further comprising a debris filter coupled to the outlet port to prevent contamination of the outlet port.

31. The system of claim 1, further comprising a diffuser located adjacent the inlet port of the carbon canister to diffuse the hydrocarbon air mixture before the hydrocarbon air mixture reaches the carbon inside the carbon canister.

32. The system of claim 1, further comprising a diffuser located adjacent the outlet port of the carbon canister to diffuse the outside air before the outside air reaches the carbon inside the carbon canister.

33. The system of claim 5, wherein the control system is further adapted to measure or estimate hydrocarbon concentration or lack of hydrocarbon concentration of the vented cleansed air residual through the outlet port of the carbon canister to determine a degree of adsorption by the carbon inside the carbon canister.

34. The system of claim 33, further comprising a sensor coupled to the outlet port of the carbon canister to measure or estimate the hydrocarbon concentration or lack of hydrocarbon concentration in the outlet port,
   wherein the control system is further adapted to measure or estimate the hydrocarbon concentration or lack of hydrocarbon concentration of the vented cleansed air residual by using the sensor measurement.

35. The system of claim 34, wherein the control system is further adapted to generate an alarm or report if the measured or estimated hydrocarbon concentration or lack of hydrocarbon concentration of the vented cleansed air residual by the sensor exceeds a threshold value.

36. The system of claim 34, wherein the control system is further adapted to close the outlet port if the measured or estimated hydrocarbon concentration or lack of hydrocarbon concentration of the vented cleansed air residual by the sensor exceeds a threshold value.

37. The system of claim 34, wherein the control system is further adapted to:
   measure a flow rate of the cleansed air residual passing through the outlet port of the carbon canister; and
   multiply the measured or estimated hydrocarbon concentration or lack of hydrocarbon concentration, respectively, times the flow rate of the cleansed air residual to determine a total hydrocarbon or air emissions from the outlet port of the carbon canister.

* * * * *